United States Patent
Lin et al.

(10) Patent No.: US 10,036,920 B2
(45) Date of Patent: Jul. 31, 2018

(54) BACKLIGHT MODULE AND A MANUFACTURING METHOD THEREOF, BACK PLATE AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Haiyun Lin, Beijing (CN); Qinghui Zhao, Beijing (CN); Dongzhao Li, Beijing (CN); Jingpeng Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/526,872

(22) PCT Filed: Aug. 2, 2016

(86) PCT No.: PCT/CN2016/092840
§ 371 (c)(1),
(2) Date: May 15, 2017

(87) PCT Pub. No.: WO2017/177579
PCT Pub. Date: Oct. 19, 2017

(65) Prior Publication Data
US 2018/0149923 A1    May 31, 2018

(30) Foreign Application Priority Data
Apr. 12, 2016  (CN) .......................... 2016 1 0223557

(51) Int. Cl.
*G02F 1/1335*        (2006.01)

(52) U.S. Cl.
CPC .. *G02F 1/133608* (2013.01); *G02F 1/133603* (2013.01)

(58) Field of Classification Search
CPC ......... G02F 1/133608; G02F 1/133603; F21V 17/00; F21V 17/04; F21V 17/10;
(Continued)

(56) References Cited

U.S. PATENT DOCUMENTS 5,807,154 A     9/1998 Watkins
2003/0001488 A1  1/2003 Sundahl
(Continued)

FOREIGN PATENT DOCUMENTS

CN    201628137    11/2010
CN    202032363    11/2011
(Continued)

OTHER PUBLICATIONS

Written Opinion of the International Searching Authority from corresponding PCT Application No. PCT/CN2016/092840, dated Dec. 29, 2016 (5 pages).
(Continued)

*Primary Examiner* — Bao Q Truong
(74) *Attorney, Agent, or Firm* — Harness, Dickey & Pierce, P.L.C.

(57) ABSTRACT

The present disclosure provides a backlight module and a method of manufacturing the same, as well as a back plate and a display device, the backlight module comprising: a backlight strip; a solder spot disposed on a back surface of the backlight strip; light strip glue attached to the side of the backlight strip on which the solder spot is disposed; and a back plate disposed on the side of the light strip glue away from the backlight strip; wherein a groove is provided on the side of the back plate adjacent to the light strip glue and at a position corresponding to the solder spot.

19 Claims, 5 Drawing Sheets

(58) Field of Classification Search
CPC .. F21V 17/101; F21V 19/001; F21V 19/0015; F21V 19/003; F21V 19/005; F21K 9/00; F21S 4/28; F21S 4/00; F21Y 2115/10; F21Y 2105/10; F21Y 2101/00
See application file for complete search history.

(56) References Cited

U.S. PATENT DOCUMENTS

| | | | |
|---|---|---|---|
| 2011/0199788 A1* | 8/2011 | Park | G02B 6/0023 362/612 |
| 2013/0130520 A1 | 5/2013 | Tang | |
| 2014/0239318 A1* | 8/2014 | Oyu | H01L 33/62 257/88 |

FOREIGN PATENT DOCUMENTS

| | | |
|---|---|---|
| CN | 202195374 U | 4/2012 |
| CN | 102466143 | 5/2012 |
| CN | 102496793 | 6/2012 |
| CN | 102681079 A | 9/2012 |
| CN | 203223817 U | 10/2013 |
| CN | 205067918 | 3/2016 |
| CN | 105652522 | 6/2016 |
| KR | 101016803 | 2/2011 |

OTHER PUBLICATIONS

Office Action from Chinese Application No. 201610223557.0 dated May 3, 2018 (6 pages).

\* cited by examiner

“BACKLIGHT MODULE AND A MANUFACTURING METHOD THEREOF, BACK PLATE AND DISPLAY DEVICE

TECHNICAL FIELD

The present disclosure relates to the field of displays, and more particularly to a backlight module and a method of manufacturing the same, as well as a back plate and a display device.

BACKGROUND

At present, the thin film transistor type liquid crystal display (TFT-LCD) has become the mainstream information display products, being more and more widely used. The current market also imposes increasingly high requirements on the back plate and bezel of the TFT-LCD backlight module, which are required not only to have a very good load-bearing capability, but also to have a light weight and a low cost. Now the common materials are steel, aluminum or plastic materials. For medium and large sized liquid crystal displays, steel, aluminum or galvanized steel (SGLC) are often used. Such a material has a strong load-bearing capability, can quickly dissipate heat, and is often applied in the graphic design. However, during assembly of the backlight module, because the solder spot is higher than the light strip printed circuit board (PCB), the back plate first contacts with the solder spot, the solder spot is squeezed, and the light strip glue on the solder spot wears out, resulting in the electrodes (negative or positive) of the light-emitting diodes (LED) to short circuit to ground, causing the undesirable effects of blueing and heated light strip. There may be a similar problem for backlight modules of other types of displays.

FIG. 1 shows a schematic structural diagram of a prior art TFT-LCD display backlight module prior to assembly. As shown in FIG. 1, the backlight module includes a back plate 1, light strip glue 2, an LED light strip 3, and solder spots 4 on the LED light strip 3, wherein a back plate 1 overlays on the light strip glue 2, the light strip glue 2 overlays on the LED light strip 3 and solder spots 4. The solder spots 4 include two solder spots corresponding to the positive and negative electrodes of the LED strip 3 respectively, and solder spots 4 have lead wires of the LED electrodes, which lead wires extend through a notch on the back plate 1 to the outside of the back plate for supplying power to the LED light strip.

FIG. 2 shows a schematic structural diagram of a prior art TFT-LCD display backlight module after assembly. As shown in FIG. 2, during the assembly process, an assembly jig is used to assemble the LED light strip 3 with the back plate 1, and since the solder spots 4 are higher than the LED light strip 3, the solder spots 4 will first contact the light strip glue 2, and in the process of approaching the back plate 1, the light strip glue may be locally worn (shown by reference numeral 7), resulting in a direct contact of a solder spot 4 with the back plate 1, thus causing the negative electrode of the LED to short circuit to ground, and the formation of an undesirable effect.

Obviously, there is a need in the art for an improved display backlight module and a method of manufacturing the same.

SUMMARY

In one aspect of the present disclosure, there is provided a backlight module, comprising: a backlight strip; a solder spot disposed on a back surface of the backlight strip; light strip glue attached to the side of the backlight strip on which the solder spot is disposed; a back plate disposed on the side of the light strip glue away from the backlight strip; wherein a groove is provided on the side of the back plate adjacent to the light strip glue and at a position corresponding to the solder spot.

In another aspect of the present disclosure, there is provided a back plate of a backlight module, having a groove disposed at a position corresponding to a solder spot on a backlight strip of the backlight module.

In another aspect of the present disclosure, there is provided a display device comprising a backlight module according to an embodiment of the present disclosure.

In another aspect of the present disclosure, there is provided a method of manufacturing a backlight module, comprising: producing a backlight strip with a solder spot disposed on a back surface of the backlight strip; attaching light strip glue to the side of the backlight strip on which the solder spot is disposed; producing a back plate and providing a groove on the side of the back plate adjacent to the light strip glue and at a position corresponding to the solder spot; and overlaying the back plate on the light strip glue, and assembling the back plate with the backlight strip.

According to the technical solution of the present disclosure, since a groove is provided at a position of the back plate corresponding to the solder spot, the light strip is not easily worn during assembly of the backlight module, thereby avoiding the direct contact between the solder spot and the back plate causing short circuit to ground of the electrode of the light strip and the resultant shortcomings, thus improving the yield.

DETAILED DESCRIPTION OF SPECIFIC EMBODIMENTS

In order to provide a better understanding of the solution of the present disclosure to those skilled in the art, a backlight module and a manufacturing method thereof, as well as a back plate and a display device, which are provided in embodiments of the present disclosure, are described in further detail below with reference to the drawings and specific embodiments. Obviously, the described embodiments are part of the present disclosure, not all embodiments. All other embodiments obtained by one of ordinary skill in the art based on the described embodiments of the disclosure without the need for creative work are within the scope of the present disclosure.

Figure 1:
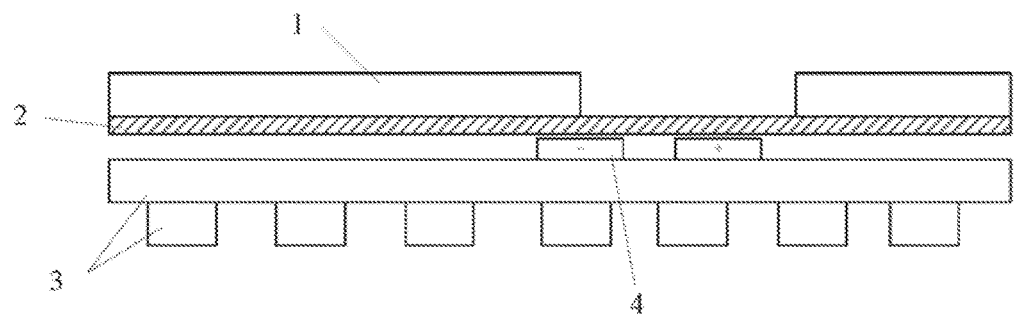
FIG. 1 shows a schematic structural diagram of a prior art TFT-LCD display backlight module prior to assembly.
Figure 2:
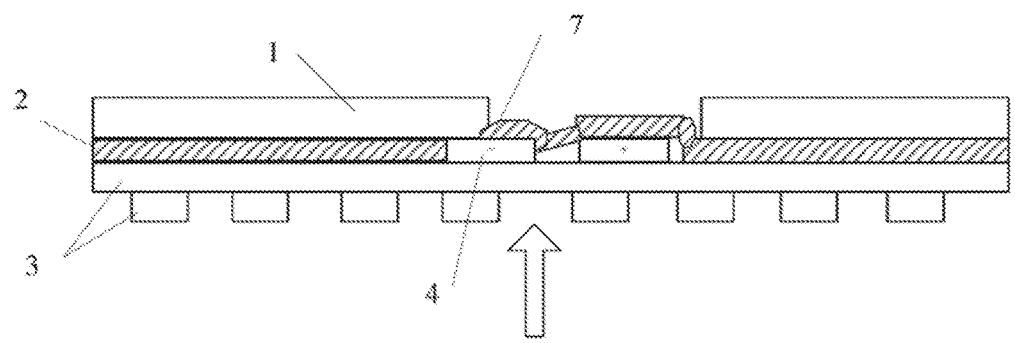
FIG. 2 shows a schematic structural diagram of a prior art TFT-LCD display backlight module after assembly.
Figure 3:
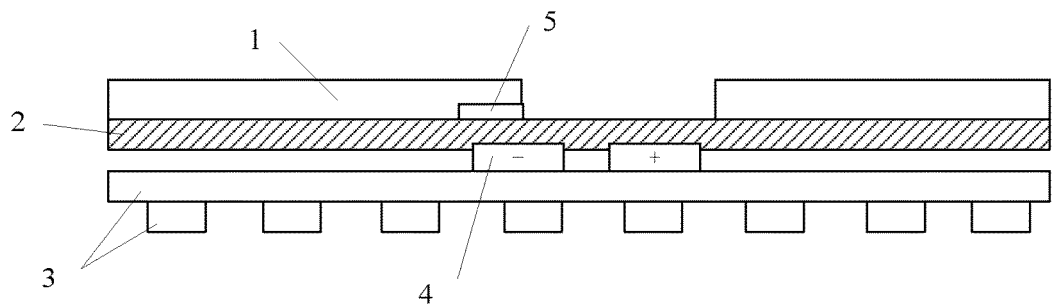
FIG. 3 shows a side view of a backlight module according to an embodiment of the present disclosure.

In one aspect of the present disclosure, a backlight module is provided. FIG. 3 shows a side view of a backlight module according to an embodiment of the present disclosure. As shown in FIG. 3, the backlight module includes a backlight light strip 3, a solder spot 4 provided on the back surface (i.e., the side close to the back plate) of the backlight strip, light strip glue 2 attached to the side of the backlight strip provided with the solder spot, and a back plate 1 disposed on the side of the light strip glue away from the backlight strip, wherein a groove 5 is provided on the side of the back plate 1 adjacent to the light strip glue and at a position corresponding to the solder spot 4.

Optionally, the backlight module is a backlight module of a display. The display may be, for example, a liquid crystal display, and more specifically, a TFT liquid crystal display. Of course, the display may also be of another type of display.

By providing a groove 5 at the side of the back plate 1 adjacent to the light strip glue and at a position corresponding to the solder spot 4, during assembly of the backlight module, when the backlight strip 3 is brought close to the back plate 1, the light strip 2 can be locally accepted into the groove 5 so as not to be easily worn, thereby avoiding the short circuit to ground of the light strip electrode caused by the direct contact between the solder spot 4 and the back plate 1 and the consequent defect, thereby improving the yield.

Figure 4:
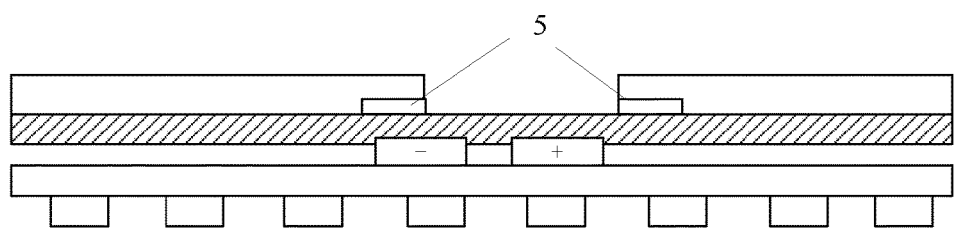
FIG. 4 shows a side view of a backlight module in which grooves are provided on both sides of a notch in a back plate and in the surface thereof adjacent to the light strip glue.

The solder spots 4 may, for example, correspond to the positions of both sides of a notch of the back plate 1, and accordingly, the grooves 5 may be provided, for example, on both side of the notch in the back plate 1 and in the surface of the back plate 1 adjacent to the light strip glue. For example, FIG. 4 shows a side view of a backlight module in which grooves 5 are provided on both sides of a notch in the back plate 1 and on the side of thereof adjacent to the light strip glue. The notch of the back plate 1 is used, for example, to extend the LED electrode lead-out line from the solder spot out of the back plate 1 for supplying power to the LED strip 3.

Optionally, the back plate 1 is of a conductive material. For example, the conductive material may be steel, aluminum or galvanized steel. Alternatively, the back plate 1 may also be other metallic materials or other conductive materials.

Figure 5:
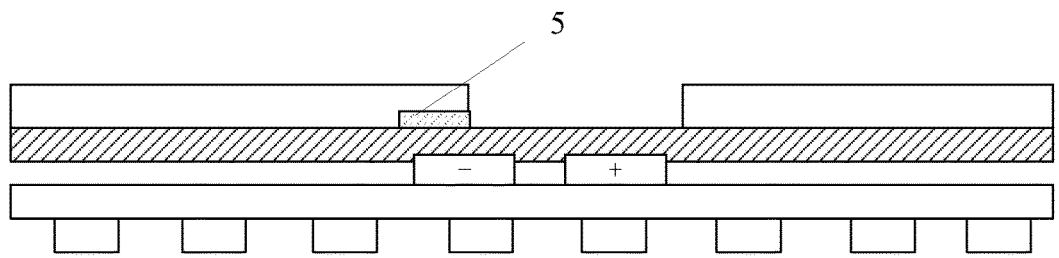
FIG. 5 is a side view of a backlight module in which an insulating material is applied in one groove provided on one side of a notch in a back plate, and a side view of a backlight module in which an insulating material is applied in two grooves provided on both sides of a notch in a back plate.
Figure 5:
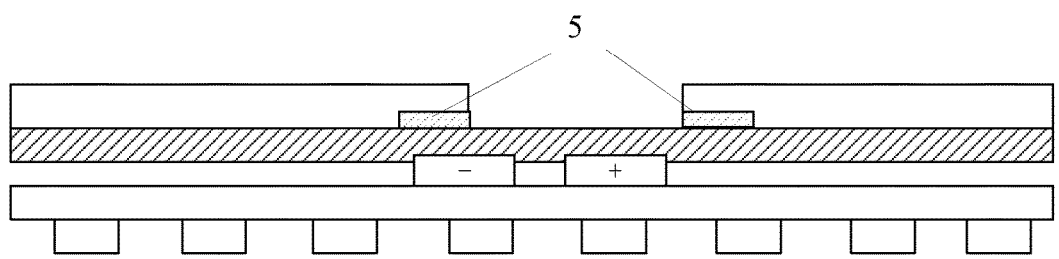

Optionally, an insulating material is applied into the groove 5. The insulating material may be any insulating material having suitable properties, for example, any kind of green insulating material. For example, FIG. 5 shows a side view of a backlight module in which an insulating material is applied in one groove provided on one side of a notch in a back plate, and a side view of a backlight module in which an insulating material is applied in two grooves provided on both sides of a notch in a back plate. By applying an insulating material in the groove 5, it is possible to more effectively prevent the direct contact of the solder spot 4 with the back plate 1 and the consequent short-circuiting to ground of the LED light strip electrode and defect. Of course, the groove 5 may also not be coated with an insulating material.

Figure 6:
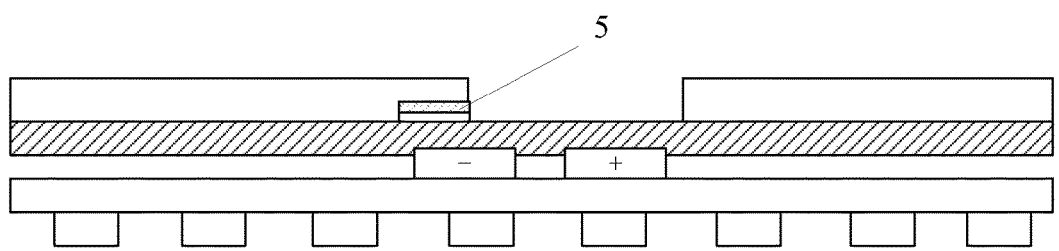
FIG. 6 shows a side view of a backlight module in which an insulating material applied in one groove provided on one side of a notch in a back plate is lower than the surface of the back plate adjacent to the light strip glue, and a side view of a backlight module in which an insulating layer applied in two grooves provided on both sides of a notch in a back plate is lower than the surface of the back plate adjacent to the light strip glue.
Figure 6:
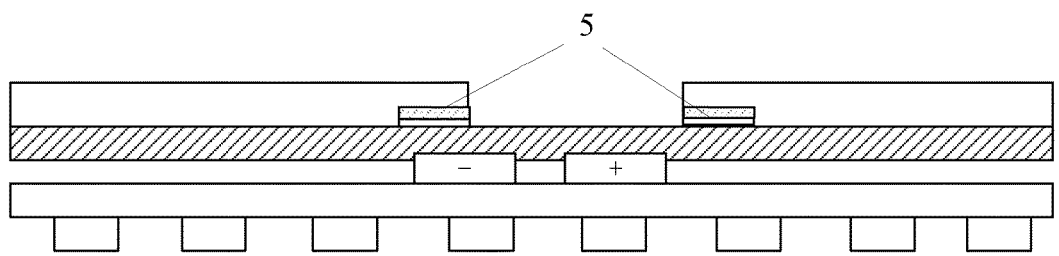

Optionally, the surface of the insulating material is flush with the side surface of the back plate 1 adjacent to the light strip glue. Alternatively, the insulating material may also be lower than the side surface of the back plate 1 adjacent to the light strip glue or slightly above the side surface of the back plate 1 adjacent to the light strip glue. For example, FIG. 6 shows a side view of a backlight module in which an insulating material applied in one groove provided on one side of a notch in a back plate is lower than the surface of the back plate adjacent to the light strip glue, and a side view of a backlight module in which an insulating layer applied in two grooves provided on both sides of a notch in a back plate is lower than the surface of the back plate adjacent to the light strip glue.

Optionally, the depth of the groove 5 is about ⅓ of the thickness of the back plate 1. Of course, the groove 1 may also have any other depth.

Optionally, the solder spot 4 comprises a plurality of solder spots, and accordingly, the groove 5 comprises a plurality of grooves. For example, the solder spot 4 may comprises two solder spots, corresponding to the positions of the two sides of the notch of the back plate 1, respectively. In this way, grooves 5 may be provided on both sides of the notch in the back plate 1 and in the side surface thereof adjacent to the light strip glue.

Optionally, the side surface of the back plate 1 adjacent to the light strip glue, the side surface of the back plate 1 away from the light strip glue, or both are in a form of a grid of dots. For example, the side surface of the back plate 1 adjacent to the light strip glue, the side surface of the back plate 1 away from the light strip glue, or both are provided with an array of dots. The array of dots may be an array of dots of the same shape, or may be an array of dots of different shapes.

Optionally, the depth of the dots is about ⅓ of the thickness of the back plate. Of course, the dots may also have any other depth.

Optionally, the shape of the dots is, for example, circular. Of course, the shape of the dots may also be any other shape, such as oval, triangular, or the like.

Figure 7:
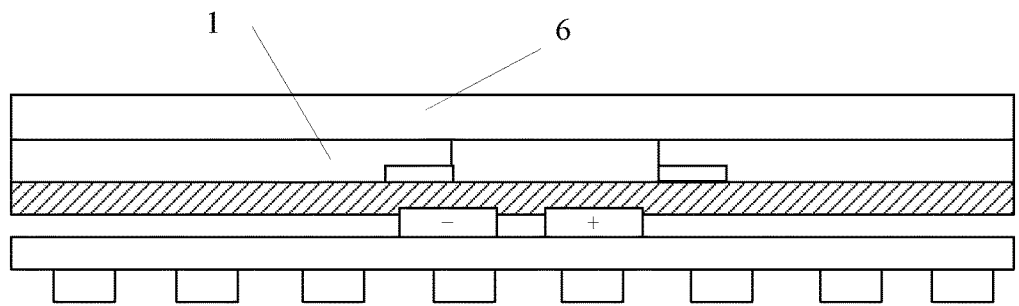
FIG. 7 shows a side view of a backlight module in which a bezel is overlaid on a peripheral portion of a backing plate.

Optionally, the backlight module further comprises a bezel 6 that overlays on a peripheral portion of the back plate 1. As shown in FIG. 7, it shows a side view of a backlight module in which a bezel 6 overlays on a peripheral portion of the back plate 1.

Optionally, an array of dots is also provided on an inner surface, an outer surface or both inner and outer surfaces of the bezel 6. The depth, shape, etc. of the dots may be the same as or different from the dots on the back plate.

Figure 8:
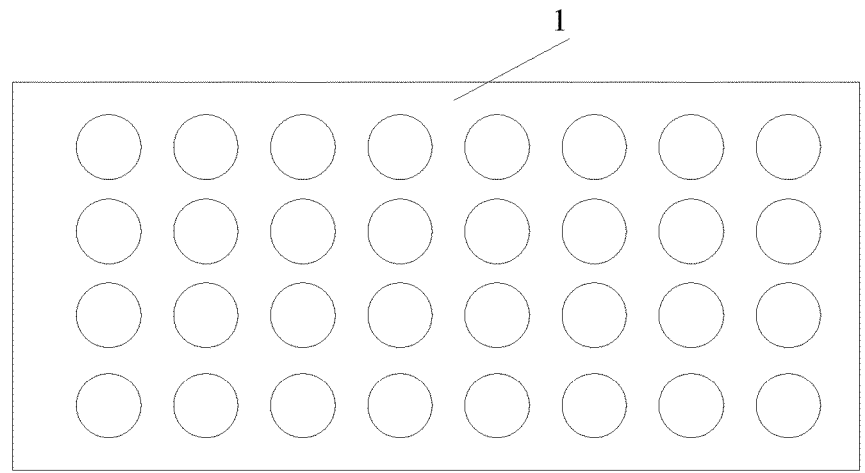
FIG. 8 shows a grid of dots on a back plate or a bezel according to an embodiment of the present disclosure.
Figure 8:
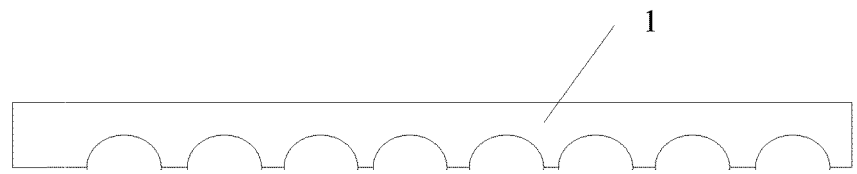
Figure 8:
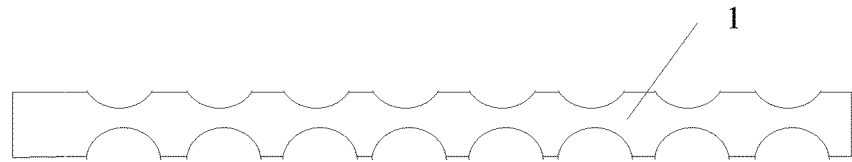

FIG. 8 shows an array of dots on a back plate 1 according to an embodiment of the present disclosure, which shows a top view and a side view of a single-sided array of dots on a plate 1 and a side view of double-sided arrays of dots on a plate 1 according to embodiments of the present disclosure. The single-side array of dots and double-sided arrays of dots of the bezel 6 are similar.

The weight of the back plate 1 and/or the bezel 6 and the cost of the material can be effectively reduced by the design of the array of dots on the surface of the back plate 1 and/or the frame 6. At the same time, the necessary strength is ensured.

The backlight module according to an embodiment of the present disclosure has been described above with reference to the accompanying drawings, and it should be noted that the above description is by way of example only and is not intended to limit the present disclosure. In other embodiments of the present disclosure, the backlight module may have more, fewer or different components, and the relationships of inclusion, connection, and function between the components may be different from those described and illustrated. For example, the features included in the above exemplary embodiments may generally be combined with each other in any manner known to those skilled in the art to form a new embodiment. Also, for example, the specific positional relationship between the components shown in the drawings does not constitute a limitation of the disclosure, unless such positional relationship is necessary to accomplish a particular function and is expressly recited in the appended claims.

In another aspect of the present disclosure, there is also provided a back plate of a backlight module in which a groove is provided at a position corresponding to a solder spot on a backlight strip of the backlight module. The back plate may be the back plate 1 in the backlight module described above, with reference to the specific features described above, and will not be described further herein.

In another aspect of the present disclosure, there is also provided a display panel comprising a backlight module as described in any one of the preceding embodiments. As will be appreciated by those skilled in the art, the display panel may also include other modules apart from the backlight module, such as an array substrate, a liquid crystal layer, a color film substrate, and the like, which may be the corresponding modules in the prior art, and will not be repeated here.

In another aspect of the present disclosure, there is also provided a display device comprising a display panel as described above. As will be appreciated by those skilled in the art, the display device may also include other modules apart from a display panel, such as a drive board, a power supply board, etc., which may be the corresponding modules in the prior art, and will not be repeated here.

Figure 9:
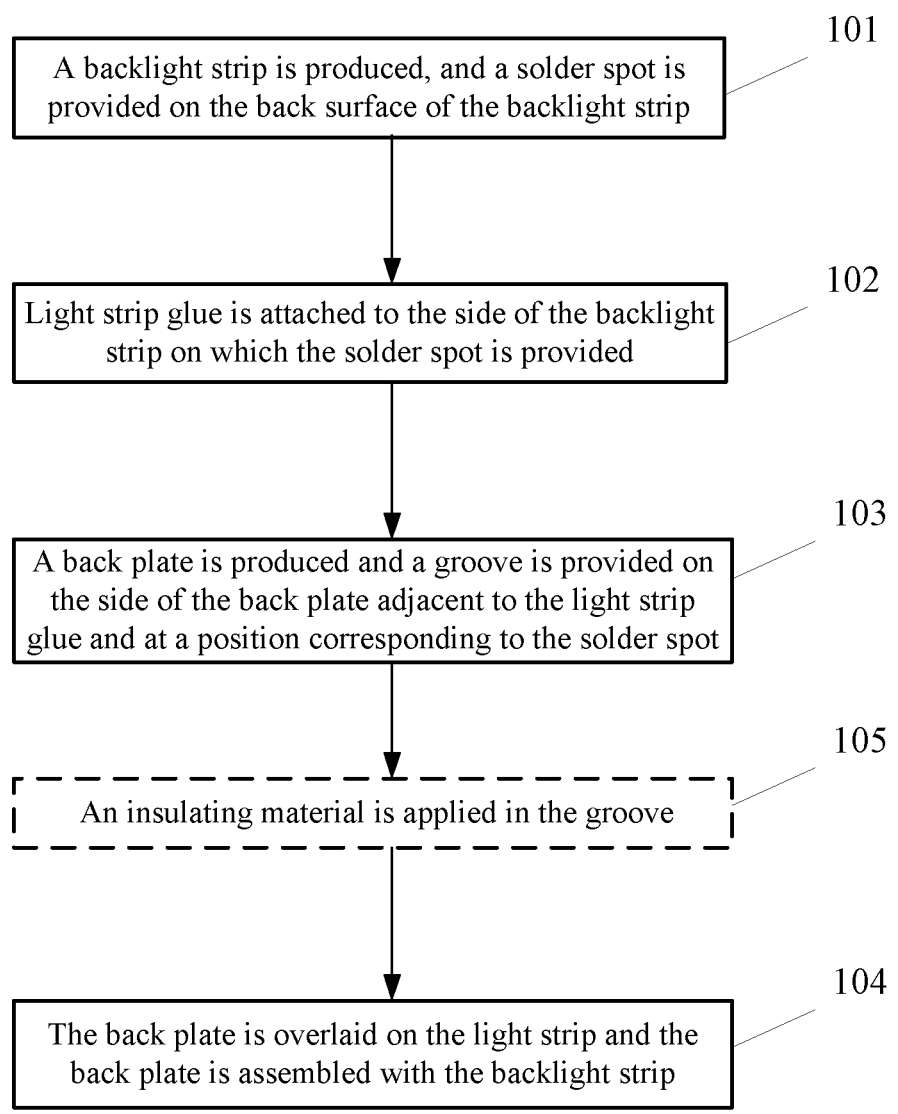
FIG. 9 shows a method of manufacturing a backlight module according to an embodiment of the present disclosure.

In another aspect of the present disclosure, there is also provided a method of manufacturing a backlight module. FIG. 9 shows a method of manufacturing a backlight module according to an embodiment of the present disclosure. As shown in FIG. 9, the method comprises the following steps:

Step 101, a backlight strip is produced, and a solder spot is provided on the back surface of the backlight strip;

Step 102, light strip glue is attached to the side of the backlight strip on which the solder spot is provided;

Step 103, a back plate is produced and a groove is provided on the side of the back plate adjacent to the light strip glue and at a position corresponding to the solder spot; and In step 104, the back plate is overlaid on the light strip and the back plate is assembled with the backlight strip.

It should be noted that the written order of the above steps does not necessarily indicate the actual execution order of these steps. For example, step 103 may also be performed prior to steps 101 and 102 or concurrently.

Optionally, the material of the backing plate is a conductive material, for example, steel, aluminum or galvanized steel sheet.

Optionally, the method further comprises the following steps:

Step 105, an insulating material is applied in the groove. The step 105 may be performed between step 103 and step 104, for example.

Optionally, Step 105 of applying an insulating material in the groove comprises:

making the insulating material flush with the inner surface of the backing plate.

Optionally, the depth of the groove is about ⅓ of the thickness of the backing plate.

Optionally, the solder spot comprises a plurality of solder spots, and accordingly, the groove comprises a plurality of grooves.

Optionally, the method further comprises the following steps:

producing a bezel;

overlaying the bezel on a peripheral portion of the back plate.

Optionally, Step 103 of making the back plate comprises:

making the inner surface, the outer surface or both the inner and outer surfaces of the back plate be in a form of a dot grid.

Optionally, the depth of the dots is about ⅓ of the thickness of the backing plate.

Optionally, the shape of the dots is circular.

Optionally, the backlight module is a backlight module of a liquid crystal display.

The method of manufacturing a backlight module according to an embodiment of the present disclosure has been described above with reference to the accompanying drawings, and it is to be noted that the above description is by way of example only and is not intended to limit the present disclosure. In other embodiments of the disclosure, the method may have more, fewer or different steps, and the relationships of order, inclusion, function etc. between the steps may be different from what has been described and illustrated. For example, a plurality of steps may also be considered as a larger step, and a plurality of sub-steps included in one step may be considered as a plurality of individual steps. For example, the order of the steps in the above description and illustrations in general does not constitute a limitation on the method of the present disclosure, and the steps may be performed in any order known to those skilled in the art or concurrently. Also, for example, the features included in the above exemplary embodiments may generally be combined with each other in any manner known to those skilled in the art to form a new embodiment.

In another aspect of the present disclosure, there is also provided a method of manufacturing a back plate of a backlight module, comprising the following step:

A groove is provided on the back plate at a position corresponding to a solder spot on a backlight grid of a backlight module.

As will be appreciated by those skilled in the art, the method of making the back plate of the backlight module may also include other steps which may be the steps in the method of making the back plate of the prior art backlight module and will not be described again.

In another aspect of the present disclosure, there is also provided a method of manufacturing a display panel comprising: manufacturing a backlight module using a method of manufacturing a backlight module according to any one of the above-described exemplary embodiments of the present disclosure.

As will be appreciated by those skilled in the art, the method of manufacturing a display panel may also include other steps which may be the steps in the method of manufacturing a display panel of the prior art and will not be described further herein.

In another aspect of the present disclosure, there is also provided a method of manufacturing a display device comprising: manufacturing a display panel using the method a manufacturing a display panel according to the above-described embodiment.

As will be appreciated by those skilled in the art, the method of manufacturing the display device may also include other steps which may be the steps in the method of manufacturing a display device of the prior art and will not be described further herein.

It is to be understood that the above embodiments of the present disclosure are merely exemplary embodiments for explaining the principles of the present disclosure, and the present disclosure is not limited thereto. It will be apparent to those skilled in the art that various changes and modifications can be made therein without departing from the spirit and spirit of the disclosure, which are also intended to be within the scope of the present disclosure. The scope of the disclosure is defined only by the meaning of the language expression of the appended claims and their equivalents.

The invention claimed is:

1. A backlight module, comprising:
   a backlight strip;
   a solder spot disposed on a back surface of the backlight strip;
   light strip glue attached to the side of the backlight strip on which the solder spot is disposed;
   a back plate disposed on the side of the light strip glue away from the backlight strip;
   wherein a groove is provided on the side of the back plate adjacent to the light strip glue and at a position corresponding to the solder spot.

2. The backlight module according to claim 1, wherein the back plate is of a conductive material.

3. The backlight module according to claim 2, wherein the conductive material is a steel, aluminum or galvanized steel plate.

4. The backlight module according to claim 1, wherein an insulating material is coated in the groove.

5. The backlight module according to claim 4, wherein the surface of the insulating material is flush with the surface of the back plate adjacent to the light strip glue.

6. The backlight module according to claim 1, wherein the depth of the groove is ⅓ of the thickness of the back plate.

7. The backlight module according to claim 1, wherein the solder spot comprises a plurality of solder spots, and accordingly, the groove comprises a plurality of grooves.

8. The backlight module according to claim 1, wherein the surface of the back plate adjacent to the light strip glue, the surface of the back plate away from the light strip glue, or both surfaces of the back plate are in a form of a dot grid.

9. The backlight module according to claim 8, wherein the depth of the dots is ⅓ of the thickness of the back plate.

10. The backlight module according to claim 1, wherein the backlight module is a backlight module of a liquid crystal display.

11. A display device, comprising the backlight module according to claim 1.

12. The method of manufacturing a backlight module, comprising:
    producing a backlight strip with a solder spot disposed on a back surface of the backlight strip;
    attaching light strip glue to the side of the backlight strip on which the solder spot is disposed;
    producing a back plate and providing a groove on the side of the back plate adjacent to the light strip glue and at a position corresponding to the solder spot; and
    overlaying the back plate on the light strip glue, and assembling the back plate with the backlight strip.

13. The method according to claim 12, further comprising:
    coating an insulating material in the groove.

14. A display device, comprising the backlight module according to claim 2.

15. A display device, comprising the backlight module according to claim 4.

16. A display device, comprising the backlight module according to claim 5.

17. A display device, comprising the backlight module according to claim 6.

18. A display device, comprising the backlight module according to claim 7.

19. A display device, comprising the backlight module according to claim 8.

* * * * *